United States Patent
Ota et al.

(10) Patent No.: US 6,398,827 B1
(45) Date of Patent: Jun. 4, 2002

(54) POLISHING COMPOSITION

(75) Inventors: Isao Ota; Tohru Nishimura; Yoshitane Watanabe; Yoshiyuki Kashima; Kiyomi Ema; Yutaka Ohmori, all of Funabashi (JP)

(73) Assignee: Nissan Chemical Industries, LTD., Tokyo (JP)

( * ) Notice: Subject to any disclaimer, the term of this patent is extended or adjusted under 35 U.S.C. 154(b) by 21 days.

(21) Appl. No.: 09/605,542

(22) Filed: Jun. 29, 2000

(30) Foreign Application Priority Data

Jul. 2, 1999 (JP) ............................. 11-188562

(51) Int. Cl.⁷ ............................. C09K 3/14; C09G 1/04; C09G 1/02
(52) U.S. Cl. ............................. 51/308; 106/3; 438/692; 438/693; 510/165; 510/167; 510/397
(58) Field of Search ............................. 51/308; 106/3; 438/692, 693; 510/165, 167, 397

(56) References Cited

U.S. PATENT DOCUMENTS

| | | | |
|---|---|---|---|
| 2,680,721 A | | 6/1954 | Broge et al. |
| 2,900,348 A | | 8/1959 | Ahlberg et al. |
| 4,959,113 A | * | 9/1990 | Roberts |
| 5,521,497 A | | 5/1996 | Schneider et al. |
| 5,997,620 A | * | 12/1999 | Kodama et al. |

FOREIGN PATENT DOCUMENTS

| | | | |
|---|---|---|---|
| EP | 0-845-512 | | 6/1998 |
| JP | A 60-204390 | | 10/1985 |
| JP | A 60-219084 | | 11/1985 |
| JP | A 61-19389 | | 1/1986 |
| JP | A 1-317115 | | 12/1989 |
| JP | A 2-276670 | | 11/1990 |
| JP | A 4-201286 | | 7/1992 |
| JP | A 6-92011 | | 4/1994 |
| JP | 7-221059 | * | 8/1995 |
| JP | A 7-276789 | | 10/1995 |
| JP | 10-204416 | * | 8/1998 |

OTHER PUBLICATIONS

U.S. Patent application 09/763,965, Docket #108734 Watanabe et al. Feb. 28, 2001.
Dennis E. Koppel; "Analysis of Macromolecular Polydispersity in Intensity Correlation Spectroscopy: The Method of Cumulants"; Dec. 1972; pp. 4814–4820; Journal of Chemical Physics, vol. 57, No. 11.*

* cited by examiner

Primary Examiner—Michael Marcheschi
(74) Attorney, Agent, or Firm—Oliff & Berridge, PLC

(57) ABSTRACT

The present invention relates to a polishing composition for polishing alumina disks, polishing substrates having silica surfaces and semiconductor wafers, comprising a stable aqueous silica sol containing moniliform colloidal silica particles having a ratio ($D_1/D_2$) of a particle diameter $D_1$ nm (as measured by dynamic light scattering method) to a mean particle diameter $D_2$ (as measured by nitrogen absorption method) of 3 or more, wherein $D_1$ is between 50 to 800 nm and $D_2$ is between 10 to 120 nm, said moniliform colloidal silica particles being composed of spherical colloidal silica particles and a metal oxide-containing silica bond which bonds these spherical colloidal silica particles together, wherein the spherical colloidal silica particles are linked together in rows in only one plane by observation through an electron microscope, and further wherein said polishing composition contains 0.5 to 50% by weight of said moniliform colloidal silica particles.

4 Claims, No Drawings

POLISHING COMPOSITION

BACKGROUND OF THE INVENTION

1. Field of the Invention

The present invention relates to a polishing composition for polishing alumina disks, polishing substrates having silica surfaces and semiconductor wafers, comprising a stable aqueous silica sol containing moniliform colloidal silica particles having a ratio ($D_1/D_2$) of a particle diameter $D_1$ nm (as measured by dynamic light scattering method) to a mean particle diameter $D_2$ (as measured by nitrogen absorption method) of 3 or more, wherein $D_1$ is between 50 to 800 nm and $D_2$ is between 10 to 120 nm, said moniliform colloidal silica particles being composed of spherical colloidal silica particles and a metal oxide-containing silica bond which bonds these spherical colloidal silica particles together, wherein the spherical colloidal silica particles are linked together in rows in only one plane by observation through an electron microscope, and further wherein said polishing composition contains 0.5 to 50% by weight of said moniliform colloidal silica particles. Hereafter, a stable aqueous silica sol containing moniliform colloidal silica particles is referred to as a moniliform silica sol.

More particularly, the moniliform silica sol is characterized by the shape of its colloidal silica particles and the polishing method of the present invention can provide highly accurate smooth polished surface efficiently and hence it is useful as a finish polishing method. Here, polishing of an aluminum disk means polishing a surface of the substrate itself of a magnetic memory disk composed of aluminum or its alloy, or a surface of a plating layer such as Ni—P, Ni—B, etc., in particular a hard layer of non-electrolysis nickel-phosphorus (Ni—P) plating having a composition of 90 to 92% Ni and 8 to 10% P and an aluminum oxide layer provided on the substrate. Polishing of a substrate having silica on its surface means polishing a surface layer on a substrate containing 50% by weight of silica or more, for example, polishing rock crystal, quartz glass for photomasks, $SiO_2$ oxide layer for semiconductor devices, crystallized glass made hard disks, and aluminosilicate glass or soda lime glass reinforced glass made hard disks. Polishing semiconductor wafers means polishing semiconductor wafers made of elemental silicon, compound semiconductor wafers made of gallium arsenide, gallium phosphide, indium phosphide, etc.

Since the polishing composition of the present invention can efficiently provide highly accurate smooth polished surfaces, it is useful In precision polishing of wiring metals such as copper and aluminum in semiconductor multilayer interconnection board, of nitride layer and of carbide layer, and in finish polishing of monocrystals such as sapphire, lithium tantalate, and lithium niobate, GHR magnetic heads. etc.

2. Description of the Related Art

An aqueous silica sol generally has the property that it is converted from a state where it has a low viscosity to a gelled state through a state where it has a high viscosity. Therefore, if the $SiO_2$ content is the same, the lower viscosity product is evaluated as being more stable than the higher viscosity product. An aqueous silica sol shows a lower viscosity the closer the shape of colloidal silica particle contained therein is to regular sphere. For this reason, aqueous sols composed of highly stable, spherical colloidal silica particles have been conventionally used partly in finish polishing of aluminum disks, glass disks, quartz glass for photomasks, rock crystal, siliceous substrates such as $SiO_2$ oxide film of semiconductor devices, monocrystals such as semiconductor wafers, sapphire, lithium tantalate. lithium niobate, etc., and MR magnetic heads. etc. However, although such silica sols give highly flat polished surfaces, it has been pointed out that they have the defect of slow polishing speed. Accordingly, to increase polishing speed, efforts have been made to change the shape of colloidal silica particles. For example, JP-A-7-221059 describes use of colloidal silica particles having a lopsided shape with a longer diameter being 7 to 1,000 nm and a ratio of shorter diameter/longer diameter being 0.3 to 0.8 in polishing semiconductor wafers results in an increased polishing speed. However, no proposal has been made for improving polishing properties such as polishing speed by using of the moniliform colloidal silica sol.

As a polishing composition for aluminum disks composed of silica (silicon dioxide), water, and a polishing accelerator, U.S. Pat. No. 4,959,113 discloses a polishing method for nickel plated aluminum disks with a polishing composition comprising water, an abrasive (silicon dioxide, aluminum oxide, cerium oxide, etc.) and a salt composed of iron ion as a cation and nitrate ion or sulfate ion as an anion. U.S. Pat. No. 5,997,620 (related patent: JP-A-10-204416) discloses a polishing composition for memory hard disks, containing water and an abrasive (silicon dioxide, aluminum oxide, cerium oxide, etc.) and soluble iron compound.

SUMMARY OF THE INVENTION

The present invention is to provide a polishing composition having excellent polishing properties for aluminum disks, glass hard disks, quartz glass, rock crystal, $SiO_2$ oxide film of semiconductor devices, elemental silicon semiconductor wafers, and compound semiconductor wafers. Further, the present invention is to provide a polishing composition for aluminum disks having an increased polishing speed by adding to the above polishing composition of the invention one or more of iron compounds selected from the group consisting of iron (III) nitrate, iron (III) chloride, iron (III) sulfate, and potassium iron (III) sulfate [$KFe(SO_4)_2$].

The moniliform silica sol as a constituent substance of the polishing composition of the present invention has a $SiO_2$ concentration of 50% by weight or less and is stable. The shape of the colloidal silica particle dispersed in a liquid medium of the silica sol of which a particle diameter ($D_1$ nm) measured by dynamic light scattering method is 50 to 800 nm is featured as follows. When observed on electron microscope, the particles are composed of spherical colloidal particles and silica bounding these spherical colloidal particles, and the colloidal silica is moniliform in shape, which are linked in rows in only one plane and the degree of linking, i.e., a $D_1/D_2$ value, the ratio of the above-described $D_1$ to a mean particle diameter $D_2$ (particle diameter measured by a nitrogen absorption method) is 3 or more.

The moniliform silica sol is a stable aqueous silica sol containing moniliform colloidal silica particles having a ratio ($D_1/D_2$) of a particle diameter $D_1$ nm (as measured by dynamic light scattering method) to a mean particle diameter $D_2$ (as measured by nitrogen absorption method) of 3 or more, wherein $D_1$ is between 50 to 800 nm and $D_2$ is between 10 to 120 nm, said moniliform colloidal silica particles being composed of spherical colloidal silica particles and a metal oxide-containing silica bond which bond which bonds these spherical colloidal silica particles together, wherein the spherical colloidal silica particles are linked together in rows in only one plane by observation through an electron microscope. The silica sol has 5 to 50% by weight of moniliform colloidal silica particles.

The moniliform silica sol can be efficiently obtained by a production method comprising the steps of (a), (b), (c), and (d) below:
(a) the step of adding an aqueous solution containing a water-soluble divalent (II) or trivalent (III) metal salt singly or in admixture to an aqueous colloid solution of activated silicic acid or acidic silica sol having a mean particle diameter of 3 to 8 nm, having an $SiO_2$ concentration of 0.5 to 10% by weight and a pH of 2 to 6, in an amount of 1 to 10% by weight of the metal oxide (MO in the case of the divalent metal (II) or $M_2O_3$ in the case of the trivalent metal (III), where M represents a divalent or trivalent metal atom, and O represents an oxygen atom) based on the $SiO_2$ in the aqueous solution of the activated silicic acid or the acidic silica sol, and mixing,
(b) the step of mixing the mixture (a) obtained in the step (a) with acidic spherical silica sol having a mean particle diameter of 10 to 120 nm and a pH of 2 to 6, in an amount such that a ratio A/B (weight ratio) of the content (A) of silica derived from the acidic spherical silica sol to the content (B) of silica derived from the mixture (a) is 5 to 100 and that total silica content (A+B) of a mixture (b) obtained by mixing the acidic spherical silica sol and the mixture (a) is an $SiO_2$, concentration of 5 to 40% by weight in the mixture (b),
(c) the step of mixing the mixture (b) obtained in the step (b) with an alkali metal hydroxide, a water-soluble organic base or water-soluble silicic acid salt thereof such that pH is 7 to 11 and mixing, and
(d) the step of heating the mixture (c) obtained in the step (c) at 100 to 200° C. for 0.5 to 50 hours.

The shape of the colloidal silica particle that constitutes the moniliform silica sol can be seen by photograph using an electron microscope. Many colloidal silica particles present in the silica sol are not limited to the same shape but present themselves commonly in moniliform. The many colloidal silica particles are roughly grouped into four groups, i.e., those linked substantially in a straight line, those linked in a curved state, those linked in a branched state, and those linked in a cyclic state. It is difficult to express their fractions in accurate figures. However, photographic observations indicates that the fractions of those linked in a curved state and those linked in a branched state are highest and these types are dominant.

Observing a single particle, it consists of spherical colloidal silica particles corresponding to "beads" of "a necklace" and silica as a linking part corresponding to the "thread" of "a necklace". That the colloidal silica particle is not in an elongated form but in a moniliform is due to a difference in the method of producing silica sol and the degree of moniliform (degree of linking of spherical colloidal silica particles) varies depending on the production conditions and the degree may be determined depending on the empirical rule of production.

Most of the colloidal silica particles in the silica sol prepared by a predetermined method under predetermined conditions have a degree of linking controlled within a certain range. The colloidal silica particles of the silica sol obtained by this method are composed of spherical colloidal silica particles of a mean particle diameter of 10 to 120 nm. Most of the colloidal silica particles in the silica sol do not have a fixed length. However, according to photographic observation, the length is 5 times or more the diameter of the sphere and usually those particles having lengths 5 to 10 times the diameter are dominant.

The colloidal silica particle that constitutes the moniliform silica sol has another feature that the moniliform linking occurs in the same plane. Since they have linking in the same plane even if they are curved or branched, all the particles are laid in the same plane at a height corresponding to the height of the spherical colloidal silica particle even if they are different in shape unless they are superimposed. In electron micrograph, the colloidal silica particles in the moniliform silica sol tend to be superimposed one on another and It is difficult to discern one end from the opposite end of one particle so that it is difficult to measure the length of that particle. However, it can be judged by photography that existence of linking of colloidal silica particles in three-dimensional directions makes a ball-like agglomeration. It can be said that basically there is no long linking in three-dimensional direction although one or two linkings occur in three-dimensional direction.

It is not appropriate to express the size of the colloidal silica particle that constitutes such a moniliform silica sol as a length presumed from an electron micrograph but it is appropriate to express it as a value measured by a dynamic light scattering method that allows measurement of the size of a particle in terms of a dimension that corresponds to length. The method for measuring particle diameter by a dynamic light scattering method is explained in Journal of Chemical Physics, vol. 57, No. 11 (December, 1972) p.4814 and can be performed using a commercially available apparatus called model $N_4$ manufactured by Coulter in U.S.A. The particle diameter ($D_1$) as the size of colloidal silica particle that constitutes the moniliform silica sol is 50 to 800 nm as measured by the dynamic light scattering method.

The mean particle diameter ($D_2$) of the spherical colloidal silica particle that constitutes the moniliform colloidal silica particle is given from a specific surface area S $m^2/g$ measured usually by a nitrogen absorption method by the equation $D_2=2720/S$ (nm).

Therefore, the ratio $D_1/D_2$ of the particle diameter $D_1$ nm measured by the above dynamic light scattering method to the above $D_2$ nm means the degree of linking (degree of length) of the moniliform colloidal silica particles. The $D_1/D_2$ value of the moniliform silica sol is 3 or more, usually 4 to 20.

The silica that bonds the spherical colloidal silica particles that constitutes the moniliform silica sol is substantially amorphous silica although it contains 0.5 to 10% by weight of divalent (II) or trivalent (III) metal oxide based on $SiO_2$ in the silica sol used in bonding and deriving from the silica sol manufacturing method.

The moniliform silica sol has an $SiO_2$ concentration of 50% by weight or less, preferably 5 to 40% by weight, and has the spherical colloidal silica particles linked in a moniliform in the same plane so that the viscosity of the moniliform silica sol is higher than that of the spherical silica sol. The viscosity of the silica sol is higher, the higher the degree of linking of the spherical colloidal particles and the content of $SiO_2$ in the silica sol are. With the above $SiO_2$, concentration of 50% by weight or less, the silica sol has a viscosity of about several mPa.s to about 1, 000 mPa.s at room temperature. The silica sol is highly stable at such a high viscosity and causes no precipitation or gelation during its storage.

DETAILED DESCRIPTION OF THE INVENTION

The content of the moniliform colloidal silica particles in the polishing composition of the present invention is 0.2 to 50% by weight, preferably 1 to 30% by weight, as $SiO_2$ concentration. If the $SiO_2$, concentration is less than 0.2% by weight, the effect of polishing is small, and if the $SiO_2$ concentration is higher than 50% by weight, the sol is unstable.

In polishing aluminum disks, the moniliform silica sol can be used as it is as an alkaline sol. Alternatively, it can also be used as a sol obtained by treating the alkaline silica sol by cation exchange resin or as an acidic sol obtained by addition of a water-soluble acidic substance such as hydrochloric acid, sulfuric acid, nitric acid, acetic acid, phosphoric acid or the like.

As the polishing accelerator, the content of iron compound such as iron (III) nitrate, iron (III) chloride, iron (III) sulfate, or potassium iron (III) sulfate is preferably 0.01 to 5.0% by weight as $Fe_2O_3$ concentration. If the $Fe_2O_3$ concentration is less than 0.01% by weight, the effect of polishing acceleration is low, and if more than 5.0% by weight, the silica sol is unstable.

In polishing glass hard disks, the moniliform silica sol can be used as it is as an alkaline aqueous silica sol. Alternatively, it can also be used as a sol obtained by treating the alkaline silica sol after cation exchange treatment or as an acidic sol obtained by addition of a water-soluble acidic substance such as hydrochloric acid, sulfuric acid, nitric acid, acetic acid, phosphoric acid or the like.

In polishing silicon semiconductor wafers, the moniliform silica sol can be used as an alkaline aqueous silica sol by addition of an alkaline substance such as sodium hydroxide, a water-soluble amine such as monoethanolamine, a quaternary ammonium base and its salt, alkali metal salt or the like, which is a known polishing accelerator. Further, in polishing compound semiconductor wafers, the alkaline aqueous silica sol may be used as a sol obtained by treating the alkaline aqueous silica sol by cation exchange resin or as an acidic sol obtained by addition of a water-soluble acidic substance such as hydrochloric acid, sulfuric acid, nitric acid, acetic acid, phosphoric acid or the like.

Further, the polishing composition of the present invention may contain alumina, zirconia, zirconium silicate, mullite, cerium oxide, iron oxide, chromium oxide, titanium oxide, tin oxide, etc. It may also contain hydrated oxides such as aluminum hydroxide, boehmite, goethite, etc. and non-oxides such as diamond, boron nitride, silicon nitride, silicon carbide, etc.

Also, water-soluble alcohols generally added to polishing compositions, such as ethanol, propanol, ethylene glycol, and propylene glycol, sodium alkylbenzenesulfonate, celluloses such as hydroxyethyl cellulose may also be added to the polishing composition of the present invention.

EXAMPLES

The present invention will be described in detail by examples. However, the present invention should not be construed as being limited thereto.

Example 1

Pure water was added to commercially available JIS No. 3 water glass ($SiO_2/Na_2O$ molar ratio: 3.22, $SiO_2$ concentration: 28.5% by weight) to obtain an aqueous solution of sodium silicate having an $SiO_2$ concentration of 3.6% by weight. By passing the aqueous solution of sodium silicate through a column packed with hydrogen-type cation exchange resin (AMBERLITE IR120B (trade name; made by Rohm and Haas Company)), a commercially available cation exchange resin provided separately, an aqueous colloid solution of activated silicic acid having an $SiO_2$ concentration of 3.60% by weight, a pH of 2.90 and a conductivity of 580 $\mu$S/cm.

183 kg ($SiO_2$ content: 6.6 kg) of the aqueous colloid solution of the activated silicic acid was charged in 500 L glass lined autoclave apparatus. 126 kg of pure water was added to the solution while stirring to obtain an aqueous colloid solution of activated silicic acid having an $SiO_2$ concentration of 2.13% by weight and a pH of 3.1. Then, 12.14 kg (CaO content: 416 g) of 10% by weight aqueous solution of calcium nitrate (pH 4.32) at room temperature was added to the diluted solution while stirring and the stirring was continued for additional 30 minutes. The calcium nitrate was 6.31% by weight as CaO based on $SiO_2$.

On the other hand, 409 kg ($SiO_2$ content: 164 kg) of an acidic spherical silica sol [SNOWNEX O-40 (trade name: manufactured by Nissan Chemical Industries, Ltd.)] having a mean particle diameter (nitrogen absorption method/$D_2$) (specific gravity: 1.289, viscosity: 4.10 mPa.s, pH: 2.67, conductivity 942 $\mu$S/om, $SiO_2$, concentration: 40.1% by weight) was charged in a separate vessel, to which was added 3.1 kg of 2% by weight of aqueous solution of sodium hydroxide while stirring and the stirring was continued for additional 30 minutes to obtain an acidic silica sol having a pH of 4.73 and an $SiO_2$, concentration of 40.0% by weight.

The particle diameter of the silica sol ($D_1$) measured by the dynamic light scattering method was 35.0 nm and $D_1/D_2$ value was 1.71. Electron microscopic observation showed that the colloidal silica particles in the silica sol are spherical and in a dispersed state close to a monodisperse state and neither linking between the colloid particles nor agglomeration was observed.

The above acidic spherical silica sol having a particle diameter of 20.5 nm was added to the aqueous colloid solution activated silicic acid to which calcium nitrate had been added while stirring and the stirring was continued for additional 30 minutes to obtain a mixture (b).

Then, 66.9 kg of 2% by weight aqueous solution of sodium hydroxide was added to the resulting mixture (b) over 10 minutes while stirring and the stirring was continued for additional 1 hours. The mixture (c) obtained by the addition of the aqueous solution of sodium hydroxide had a pH of 9.60 and a conductivity of 3,260 $\mu$S/cm, an $SiO_2$ concentration of 21.5% by weight, and an $SiO_2/Na_2O$ molar ratio of 163.

Then, 800 kg of the above alkaline mixture (c) was heated at 145° C. for 3 hours while stirring and then cooled and 800 kg of the content was taken out. The resulting liquid was transparent colloid-colored silica sol, had an $SiO_2$, concentration of 21.5% by weight, an $SiO_2/Na_2O$ molar ratio of 200, a pH of 9.78, a specific gravity of 1.138, a viscosity of 9.5 mPa.s, a conductivity of 3,335 $\mu$S/cm, and a particle diameter ($D_1$) measured by the dynamic light scattering method of 128 nm.

Therefore, $D_1/D_2$ ratio was 6.24. Electron microscopic observation revealed that the colloidal silica particles in the obtained silica sol contains moniliform colloidal silica particles composed of spherical colloidal silica particles and silica bonding these spherical colloidal silica particles, and in which the spherical colloidal silica particles link in rows in only one plane but no three-dimensional gel structure particle was observed.

No visible silica gel was present in the silica sol and the silica sol was stable since no precipitation or gelation was observed after leaving the silica sol to stand at room temperature for 6 months.

10% Nitric acid and pure water were added to the resulting alkaline silica sol to prepare a polishing composition (A) containing moniliform colloidal silica particles, having a pH 7.10 and an $SiO_2$ concentration of 14.0% by weight.

Example 2

10% Nitric acid and pure water were added to the alkaline silica sol obtained in Example 1 to prepare a polishing composition (B) containing moniliform colloidal silica particles, having a pH of 2.20 and an $SiO_2$ concentration of 14.0% by weight.

Example 3

1,000 g ($SiO_2$ content: 215 g) of the alkaline silica sol obtained in Example 1 was passed through a column packed with hydrogen-type cation exchange resin (AMBERLITE IR 120B (trade name)), to obtain 967 g of an acidic silica sol having an $SiO_2$ concentration of 20.8% by weight, a pH of 2.50, a conductivity of 1,930 µS/cm, and a viscosity of 25 mPa.s.

The particle diameter ($D_1$) measured by the dynamic light scattering method of the obtained silica sol was 125 nm. Therefore, $D_1/D_2$ ratio was 6.20. It was confirmed that the moniliform linking was unchanged by acidification. No difference between the colloidal silica particles in the alkaline sol and that of in the obtained silica sol was observed by electron microscopic observation. The acidic sol was stable since no precipitation or gelation was observed after leaving the silica sol to stand at room temperature for 6 months.

Pure water was added to the obtained acidic silica sol to prepare a polishing composition (C) containing moniliform colloidal silica particles having an $SiO_2$ concentration of 14.0% by weight.

Example 4

An aqueous solution of iron (III) nitrate was added to the acidic silica sol obtained in Example 3 to prepare a polishing composition (D) containing moniliform colloidal silica particles containing iron (III) nitrate in a concentration of 0.62% by weight as $Fe_2O_3$ concentration and having an $SiO_2$ concentration of 14.0% by weight, a pH of 1.83, and a conductivity of 25.35 mS/cm.

Example 5

An aqueous solution of iron (III) chloride was added to the acidic silica sol obtained in Example 3 to prepare a polishing composition (E) containing moniliform colloidal silica particles containing iron (III) chloride in a concentration of 0.62% by weight as $Fe_2O_3$ concentration and having an $SiO_2$ concentration of 14.0% by weight, a pH of 1.73, and a conductivity of 26.35 mS/cm.

Example 6

An aqueous solution of potassium iron (III) sulfate was added to the acidic silica sol obtained in Example 3 to prepare a polishing composition (F) containing moniliform colloidal silica particles containing potassium iron (III) sulfate in a concentration of 0.62% by weight as $Fe_2O_3$ concentration and having an $SiO_2$ concentration of 14.0% by weight, a pH of 7.0, and a conductivity of 1,200 µS/cm.

Comparative Example 1

10% Nitric acid and pure water were added to a spherical silica sol [SNOWTEX-50(trade name)] having a mean particle diameter (nitrogen absorption method/$D_2$) of 22.9 nm (manufactured by Nissan Chemical Industries, Ltd.) (specific gravity: 1.376, viscosity: 19.9 mPa.s, pH: 9.20, $SiO_2$ concentration: 48.1% by weight) to prepare a polishing composition (α) containing spherical colloidal silica particles having a pH of 4.00 and an $SiO_2$, concentration of 14.0% by weight.

Comparative Example 2

10% Nitric acid and pure water were added to a spherical silica sol [SNOWTEX-O-40(trade name)] having a mean particle diameter (nitrogen absorption method/$D_2$) of 20.5 nm (manufactured by Nissan Chemical Industries, Ltd.) (specific gravity; 1.289, viscosity: 4.10 mPa.s, pH: 2.67, conductivity: 942 µS/cm, a $SiO_2$ concentration: 40.1% by weight) to prepare a polishing composition (β) containing spherical colloidal silica particles having a pH of 2.30 and an $SiO_2$ concentration of 14.01 by weight.

Comparative Example 3

An aqueous solution of aluminum nitrate was added to the acidic silica sol obtained in Example 3 to prepare a polishing composition (γ) containing moniliform colloidal silica particles containing aluminum nitrate in a concentration of 0.62% by weight as $Al_2O_3$ concentration and having an $SiO_2$ concentration of 14.0% by weight, a pH of 2.75, and a conductivity of 31.10 mS/cm.

Comparative Example 4

An aqueous solution of nickel nitrate was added to the acidic silica sol obtained in Example 3 to prepare a polishing composition (δ) containing moniliform colloidal silica particles containing nickel nitrate in a concentration of 0.62% by weight as NiO concentration and having an $SiO_2$, concentration of 14.0% by weight, a pH of 2.85, and a conductivity of 18.40 mS/cm.

[Polishing Tests of Aluminum Disks and Glass Hard Disks]

Polishing tests of the compositions (A) to (F) of the present invention and polishing compositions (α) to (δ) of comparison were performed as follows.

As the aluminum disks, 3.5 inch-φ aluminum substrates non-electrolysis plated with nickel-phosphorus (Ni—P) plating (a hard layer of non-electrolysis nickel-phosphorus (Ni—P) plating of 90 to 92% Ni and 8 to 10% of P) to a thickness of 10 µm were used. The substrates had been subjected to preliminary polishing and had a mean surface roughness of 9.3 angstroms.

As the glass hard disks, 3.5 inch-φ reinforced glass made substrates having an $SiO_2$, concentration of 77.9% by weight, an $Al_2O_3$ concentration of 17.3% by weight, a $ZrO_2$concentration of 2.2% by weight, and a ZnO concentration of 1.6% by weight were used. The substrates had been subjected to preliminary polishing and had a mean surface roughness of 7.3 angstroms.

To the stool of polishing machine (LAPMASTER LM-15 polisher (trade name; manufactured by Lapmaster SFT Corp.)) was attached an artificial suede type polyurethane polishing pad (POLITEX DG (trade name, 380 mm-Φ, manufactured by Rodel Nitta Co., Ltd.)) and this was opposed to the polishing surface of the substrate under a load of 11 kPa to perform polishing.

The rotation number of stool was 45 rotations per minute and the feed amount of the polishing composition was 10 ml/minute. After the polishing, the polished products were taken out and washed with pure water and then dried. By a decrease in weight, polishing speed was obtained. The mean surface roughness (Ra) and mean waving (Wa) of the polished surface was measured by using a measuring device (NEW VIEW 100 (trade name; manufactured by Zygo Corp.)). Surface defects such as pits and scratches were observed on a differential interference microscope.

The results of polishing tests on polishing speed, mean surface roughness (Ra), and the occurrence of pits and scratches are shown in Table 1 for aluminum disks and in Table 2 for glass hard disks.

In the current polishing tests, the polished surfaces of aluminum disks and glass hard disks showed no surface defects such as pits and scratches.

TABLE 1

| Polishing Composition | Polishing accelerator | Polishing speed (nm/min) | Mean surface roughness (Å) | Mean waving (Å) |
| --- | --- | --- | --- | --- |
| A | None | 28 | 2.6 | 2.6 |
| B | None | 48 | 2.7 | 2.9 |
| C | None | 47 | 2.7 | 3.1 |
| α | None | 11 | 3.1 | 3.6 |
| β | None | 27 | 3.0 | 3.8 |
| D | Iron Nitrate | 170 | 3.3 | 3.2 |
| E | Iron Chloride | 169 | 3.4 | 3.2 |
| F | Potassium iron sulfate | 158 | 3.3 | 3.3 |
| γ | Aluminum nitrate | 33 | 2.8 | 3.0 |
| δ | Nickel nitrate | 38 | 2.9 | 3.3 |

TABLE 2

| Polishing Composition | Polishing accelerator | Polishing speed (nm/min) | Mean surface roughness (Å) | Mean waving (Å) |
| --- | --- | --- | --- | --- |
| C | None | 21 | 6.8 | 4.4 |
| β | None | 17 | 6.9 | 5.5 |

In the polishing of aluminum disks in Table 1, comparison of the polishing composition (A) containing the moniliform colloidal silica particles with the polishing composition (α) containing the spherical colloidal silica particles indicates that the polishing composition (A) provides a polishing speed by 2 folds or more faster than that of the polishing composition (α) and exhibits better mean surface roughness and mean waving than those of the polishing composition (α). Also, in the case where the polishing composition had a pH of 2 to 3, in the case of the polishing composition (B) and (C) that contained moniliform colloidal silica particles, they gave a polishing speed by 1.5 folds faster than that attained by the polishing composition (β) containing spherical colloidal silica particles and exhibited better mean surface roughness and mean waving than those of the polishing composition (β).

The polishing compositions (D) to (F) containing iron compounds as polishing accelerators, when compared with the polishing composition (γ) and (δ) containing metal salt other than the iron compounds, are faster by 4 folds or more in polishing speed but are identical in mean surface roughness and mean waving.

In the polishing of glass hard disks in Table 2, it reveals that the polishing composition (C) containing moniliform colloidal silica particles is identical in polishing speed and mean surface roughness with the polishing composition (β) containing spherical colloidal silica particles but is better in mean waving than the polishing composition (β).

Example 7

When the moniliform alkaline silica sol obtained in Example 1 was diluted with pure water so as to have an $SiO_2$ concentration of 2.0, 4.0, and 10.0% by weight, respectively, the dilutions were adjusted to pH 10.5 with an aqueous solution of sodium hydroxide to produce polishing compositions G-1, G-2, and G-3 each containing moniliform colloidal silica particles.

Comparative Example 5

When a spherical silica sol [SNOWTEX-50 (trade name); manufactured by Nissan Chemical Industries, Ltd. (specific gravity: 1.376, viscosity: 19.9 mPa.s, pH: 9.20, $SiO_2$ concentration: 48.1% by weight)] was diluted with pure water so as to have an $SiO_2$, concentration of 2.0, 4.0, and 10.0% by weight, respectively, the dilutions were adjusted to pH 10.5 with an aqueous solution of sodium hydroxide to produce polishing compositions ε-1, ε-2, and ε-3 each containing spherical colloidal silica particles.

[Polishing tests of elemental silicon semiconductor wafer]

Polishing tests with the polishing compositions (G) and (ε) were performed as follows.

As the elemental silicon semiconductor wafers, 3.0 inch-φ substrates were used.

To the stool of polishing machine (LAPMASTER LM-15 polisher (trade name; manufactured by Lapmaster SFT Corp.)) was attached an artificial suede type polyurethane polishing pad (SUBA 800 (trade name; 380 mm-Φ, manufactured by Rodel Nitta Co., Ltd.)) and this was opposed to the polishing surface of the substrate under a load of 11 kPa to perform polishing.

The rotation number of stool was 45 rotations per minutes and the feed amount of the polishing composition was 10 ml/minute. After the polishing, the polished products were taken out and washed with pure water and then dried. By a decrease in weight, polishing speed was obtained.

The results of polishing tests on polishing speed are shown in Table 3 for elemental semiconductor wafers.

TABLE 3

| Polishing Composition | $SiO_2$ concentration (% by weight) | Polishing speed (nm/min) |
| --- | --- | --- |
| G-1 | 2.0 | 131 |
| G-2 | 4.0 | 150 |
| G-3 | 10.0 | 189 |
| ε-1 | 2.0 | 124 |
| ε-2 | 4.0 | 139 |
| ε-3 | 10.0 | 170 |

From table 3, it can be seen that when the $SiO_2$ concentration is the same, the polishing compositions (G) containing the moniliform colloidal silica particles are faster in polishing speed than the polishing compositions (ε) containing the spherical colloidal silica particles.

Effect of the Invention

Use of polishing composition containing a stable moniliform silica sol having spherical colloidal silica particles linked in rows in only one plane and dispersed in a liquid medium in precision polishing of aluminum disks, glass hard disks, quartz glass for photomasks, rock crystal, substrates having silica on the surface thereof such as $SiO_2$ oxide film of semiconductor devices, and semiconductor wafers gives an increased polishing speed and a good polished surface. This effect is presumed to be largely attributable to the shape of moniliform colloidal silica particles having spherical colloidal silica particles linked in rows only in a plane.

Addition of trivalent iron compounds to the polishing composition containing the moniliform colloidal silica particles as a polishing accelerator gives a polishing speed much faster than polishing compositions to which metal salts other than the trivalent iron compounds are added and also gives good polished surfaces.

The polishing compositions containing the moniliform silica sol are excellent in polishing properties as compared with those containing the spherical silica sol, so that highly accurate smooth polished surfaces can be obtained efficiently. Therefore, they are useful in precision polishing of wiring metals such as copper and aluminum in semiconductor multilayer interconnection board, of nitride layer and of carbide layer, and in finish polishing of monocrystals such as sapphire, lithium tantalate, and lithium niobate, GMR magnetic heads, etc.

What is claimed is:

1. A polishing composition for polishing alumina disks, comprising a stable aqueous silica sol containing moniliform colloidal silica particles having a ratio ($D_1/D_2$) of a particle diameter $D_1$ nm (as measured by dynamic light scattering method) to a mean particle diameter $D_2$ (as measured by nitrogen adsorption method) of 3 or more, wherein $D_1$ is between 50 to 800 nm and $D_2$ is between 10 to 120 nm, said moniliform colloidal silica particles being composed of spherical colloidal silica particles and a metal oxide-containing silica bond which bonds these spherical colloidal silica particles together, wherein the spherical colloidal silica particles are linked together in rows in only one plane by observation through an electron microscope, and further wherein said polishing composition containing 0.5 to 50% by weight of said moniliform colloidal silica particles.

2. The polishing composition according to claim 1, further comprising 0.01 to 5.0% by weight, expressed as an $Fe_2O_3$ concentration, of at least one iron compound selected from the group consisting of iron (III) nitrate, iron (III) chloride, iron (III) sulfate, and potassium iron (III) sulfate.

3. A polishing composition for polishing substrates having silica surfaces, comprising a stable aqueous silica sol containing moniliform colloidal silica particles having a ratio ($D_1/D_2$) of a particle diameter $D_1$ nm (as measured by dynamic light scattering method) to a mean particle diameter $D_2$ (as measured by nitrogen adsorption method) of 3 or more, wherein $D_1$ is between 50 to 800 nm and $D_2$ is between 10 to 120 nm, said moniliform colloidal silica particles being composed of spherical colloidal silica particles and a metal oxide-containing silica bond, which bonds these spherical colloidal silica particles together, wherein the spherical colloidal silica particles are linked together in rows in only one plane by observation through an electron microscope, and further wherein said polishing composition contains 0.5 to 50% by weight of said moniliform colloidal silica particles.

4. A polishing composition for polishing semiconductor wafers, comprising a stable aqueous silica sol containing moniliform colloidal silica particles having a ratio ($D_1/D_2$) of a particle diameter $D_1$ nm (as measured by dynamic light scattering method) to a mean particle diameter $D_2$ (as measured by nitrogen adsorption method) of 3 or more, wherein $D_1$ is between 50 to 800 nm and $D_2$ is between 10 to 120 nm, said moniliform colloidal silica particles being composed of spherical colloidal silica particles and a metal oxide-containing silica bond which bonds these spherical colloidal silica particles together, wherein the spherical colloidal silica particles are linked in rows in only one plane by observation through an electron microscope, and further wherein said polishing composition comprises 0.5 to 50% by weight of said moniliform colloidal silica particles.

* * * * *

UNITED STATES PATENT AND TRADEMARK OFFICE
CERTIFICATE OF CORRECTION

PATENT NO.    : 6,398,827 B1  
DATED         : June 4, 2002  
INVENTOR(S)   : Isao Ota et al.

It is certified that error appears in the above-identified patent and that said Letters Patent is hereby corrected as shown below:

Title page,
Item [57], ABSTRACT,
Line 2, change "alumina disks" to -- aluminum disks --;
Line 5, change "$D_1$ nm" to -- $D_1$ --.

Column 1,
Line 6, change "alumina disks" to -- aluminum disks --;
Line 10, change "$D_1$ nm" to -- $D_1$ --;

Column 2,
Line 59, change "$D_1$ nm" to -- $D_1$ --.

Column 11,
Line 16, change "alumina" to -- aluminum --;
Line 19, change "$D_1$ nm" to -- $D_1$ --;

Column 12,
Line 4, change "$D_1$ nm" to -- $D_1$ --;
Line 21, change "$D_1$ nm" to -- $D_1$ --.

Signed and Sealed this

Twenty-fifth Day of March, 2003

JAMES E. ROGAN  
*Director of the United States Patent and Trademark Office*